(12) United States Patent
Betzler et al.

(10) Patent No.: US 8,424,065 B2
(45) Date of Patent: Apr. 16, 2013

(54) APPARATUS AND METHOD OF IDENTITY AND VIRTUAL OBJECT MANAGEMENT AND SHARING AMONG VIRTUAL WORLDS

(75) Inventors: Boas Betzler, Yorktown Heights, NY (US); Neil A. Katz, Yorktown Heights, NY (US); Gang Wang, Yorktown Heights, NY (US); Meng Ye, Yorktown Heights, NY (US); Zi Yu Zhu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 632 days.

(21) Appl. No.: 12/626,367

(22) Filed: Nov. 25, 2009

(65) Prior Publication Data

US 2011/0126272 A1    May 26, 2011

(51) Int. Cl.
*G06F 21/00*    (2006.01)
(52) U.S. Cl.
USPC ...... 726/4; 726/6; 726/28; 713/170; 380/258; 455/414.1; 705/50; 715/757; 715/850; 709/204; 709/223
(58) Field of Classification Search .............. 726/6, 28, 726/4
See application file for complete search history.

(56) References Cited

U.S. PATENT DOCUMENTS

| 6,119,229 | A   | * | 9/2000  | Martinez et al. ................ 726/28 |
| 6,275,944 | B1  |   | 8/2001  | Kao et al. |
| 6,826,692 | B1  |   | 11/2004 | White |
| 6,892,307 | B1  |   | 5/2005  | Wood et al. |
| 7,188,181 | B1  |   | 3/2007  | Squier et al. |
| 7,720,687 | B2  | * | 5/2010  | Jung et al. ...................... 705/1.1 |
| 2003/0014423 | A1 | * | 1/2003  | Chuah et al. .................. 707/102 |
| 2003/0167412 | A1 | * | 9/2003  | Takauji et al. ................ 713/201 |
| 2008/0282090 | A1 | * | 11/2008 | Leybovich ..................... 713/182 |
| 2009/0043683 | A1 | * | 2/2009  | Jung et al. ....................... 705/35 |
| 2009/0106347 | A1 | * | 4/2009  | Harwood et al. ............. 709/203 |
| 2009/0138355 | A1 | * | 5/2009  | Jung et al. ....................... 705/14 |
| 2009/0228809 | A1 | * | 9/2009  | Leahy et al. .................. 715/757 |
| 2010/0088650 | A1 | * | 4/2010  | Kaltenbach et al. .......... 715/849 |
| 2011/0072367 | A1 | * | 3/2011  | Bauer ............................ 715/757 |
| 2011/0099608 | A1 | * | 4/2011  | Queck et al. ...................... 726/4 |

OTHER PUBLICATIONS

Foster et al., "The Anatomy of the Grid Enabling Scalable Virtual Organizations", Intl J. Supercomputer Applications, 2001.*
Laferriere et al., "Authentication and Authorization Techniques in Distributed", IEEE, 1993, pp. 164-170.
Arnold et al., "Logon Assist for Multiple Logons", IBM Technical Disclosure Bulletin, Jan. 1990, pp. 303-305. Ogden, "Temporary Global Passwords", IBM Technical Disclosure Bulletin, Mar. 1993, pp. 451-454.
Banning et al., "Network Signon Coordination Configuration", IBM Technical Disclosure Bulletin, Dec. 1993, pp. 389-396.
OpenID Authentication 2.0—Final, Dec. 5, 2007.

* cited by examiner

*Primary Examiner* — Morshed Mehedi
(74) *Attorney, Agent, or Firm* — Scully, Scott, Murphy & Presser, P.C.; Daniel P. Morris, Esq.

(57) ABSTRACT

A system for centrally managing credential information of a user and a virtual object of a user across a plurality of virtual world (or corresponding virtual world servers) is disclosed. The system includes an identity service module for managing an authentication request (e.g., verifying credential information of a user) from a user and an inventory service module for managing virtual properties of a user. Furthermore, a method for logging in a virtual world by using the system is disclosed. A method for teleporting a virtual property from a virtual world to another virtual world by using the system is disclosed. A method for logging out from a virtual world by using the system is also disclosed.

17 Claims, 6 Drawing Sheets

APPARATUS AND METHOD OF IDENTITY AND VIRTUAL OBJECT MANAGEMENT AND SHARING AMONG VIRTUAL WORLDS

BACKGROUND

The present invention generally relates to 2D (two dimensional) or 3D (three dimensional) virtual worlds. More particularly, the present invention relates to a system and method for centrally managing an authentication process and teleporting virtual properties from a virtual world to another virtual world. The present invention is also relates to a system or method for centrally managing credential information and virtual properties across a plurality of virtual worlds.

As virtual worlds (e.g., SecondLife™, Active Worlds™) become more and more popular in recent years, there are trends that different virtual worlds can interoperate. Interoperability is a property referring to an ability of diverse systems and organizations to work together. Interoperability can further mean an ability of two or more systems or components to exchange information and to use the information that has been exchanged. A further trend is an ability to teleport virtual properties between different virtual worlds freely. These virtual worlds may be hosted by the same or different vendors, and scenes (e.g., virtual scenes) and the underlying engine (e.g., software implementing the virtual worlds) may be homogeneous or heterogeneous. Thus, providing a user with a same appearance and a same identity in different virtual worlds (even the current 2D web) is highly demanded. The same appearance refers to an avatar having same size, same color, same shape and same name across different virtual worlds. The same identity refers to a same login ID, same password and same username across different virtual worlds.

Currently, different virtual worlds use different formats of user identifiers (e.g., login ID, username, password, etc.) to login. For example, SecondLife™ requires first name/last name pairs to sign in, while in Active Worlds™ there may be a length limitation on usernames. Thus, users have to remember all these kinds of usernames/passwords (e.g., users have to remember each login ID/password for each virtual world) to access and/or play in different kinds of virtual worlds. A lack of a universal username/password that can be accepted in all the virtual worlds provides hardships to users when they want to teleport their virtual properties between different virtual worlds. The lack of a universal username/password prevents a user from being appeared in a unified identity or appearance in the different virtual worlds.

Therefore, it is highly desirable to provide a system or method for centrally managing credential information (e.g., login ID, password, username, email address, etc.) of users across all the virtual worlds and for enabling a user to teleport virtual properties of him/her from a virtual world to another virtual world.

BRIEF SUMMARY

On embodiment of the present invention is a system for centrally managing credential information and virtual properties across a plurality of virtual worlds. Another embodiment of the present invention is a method for logging in a virtual world by using the system that centrally manages the credential information and the virtual properties of users. A further embodiment of the present invention is a method for teleporting the virtual properties from a virtual world (e.g., a first virtual world) to another virtual world (e.g., a second virtual world) by using the system.

Thus, in one embodiment, there is provided a system for centrally managing credential information of users and virtual properties of the users across a plurality of virtual worlds, comprising:

an identity service module for receiving authentication requests and the credential information of the users from the users, and generating a result of each authentication request, the result indicating whether the users are valid users of the plurality of virtual worlds;

an inventory service module for receiving the result of the authentication request from the identity service module and transmitting the virtual properties to at least one virtual world server associated with the plurality of virtual worlds if the results of the authentication request is successful; and a central storage device for communicating with the inventory service module and storing the virtual properties provided from the inventory service module and the credential information provided from the identity service module.

In a further embodiment, the identity service module performs one or more of an identity creation, an identity enumeration, an identity query, an identity deletion, an identity modification and an identity authentication.

In a further embodiment, the credential information of uses comprises one or more of: a username, password and biometric information such as fingerprint, iris scan, voice and facial scan.

In one embodiment, there is provided a method for accessing a virtual world server via a virtual world client device, the method comprising:

receiving from the virtual world client device a request to log in to the virtual world server;

establishing a communication link between the virtual world server and an identity service module that authenticate whether the request is valid or not and then to establish another communication link between the virtual world client device and the identity service module for the authentication;

receiving, at the identity service module, credential information from the virtual world client device and mapping the credential information to an ID (identity) in the identity service module to authenticate the credential information with the identity service module;

generating, at the identity service module, a result of authenticating the credential information;

receiving, at the virtual world server, the generated result of authenticating the credential information;

providing the generated result from the virtual world server to the virtual world client device;

determining whether the generated result indicates log in success or failure;

displaying an error message on the virtual world client device, if the generated result indicates a login failure;

providing a token from the virtual world server to the virtual world client device, if the generated result indicates a login success;

requesting, at the virtual world server, data transmission from the inventory service module to the virtual world server;

verifying, at the inventory service module, whether the generated result was the login success;

transmitting virtual object data from the inventory service module to the virtual world server upon verifying that the generated result was the login success; and providing the transmitted data from the virtual world server to the virtual world client device for presentation and display thereof.

In a further embodiment, the credential information of uses comprises one or more of a username, password and biometric information such as fingerprint, iris scan, voice and facial scan.

In one embodiment, there is provided a method for teleporting a virtual property of a user from a first virtual world to a second virtual world by using an identity service module, the first virtual world being associated with a first virtual world server, the second virtual world being associated with a second virtual world server, the method comprising:

accessing the first virtual world via a virtual world client device;

requesting a teleportation of the virtual property from the first virtual world server to the second virtual world server;

upon receiving the teleportation request at the second virtual world server, propagating the teleportation request from the second virtual world server to the identity service module;

establishing a link between the virtual world client device and the identity service module for an authentication of the virtual world client device;

evaluating whether the virtual world client device has a valid token by communicating between the virtual world client device and the identity service module via the link;

if the virtual world client device does not have the valid token, sending an error message from the identity service module to the second virtual world server;

upon receiving the error message at the second virtual world server, rejecting the teleportation request at the second virtual world server;

if the virtual world client device has the valid token, transmitting the virtual property from the first virtual world server to the second virtual world server;

transferring the transmitted virtual property from the second virtual world to the virtual world client device;

exiting the first virtual world server via the virtual world client device; updating the identity service module to reflect the transmitting, the transferring and the signing out; and displaying the transmitted virtual property in the second virtual world via the virtual world client device.

BRIEF DESCRIPTION OF THE SEVERAL VIEWS OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

DETAILED DESCRIPTION

In one embodiment of the present invention, "virtual world" refers to current or future 3D (three dimensional) virtual environments where a plurality of users, via avatars, interact within. SecondLife™, Active Worlds™ and Forterra™ are examples of the virtual worlds. An authentication process refers to logging in (signing in) or logging out (singing out) process. Logging in (login) is a process by which an access to a computer system is controlled by an identification of a user to obtain a permission to access the computer system. Teleporting refers to transferring or transmitting instantaneously without physically traversing a space between but rather by an advance technological means. A virtual property refers to an avatar, a virtual building, a virtual asset, virtual money and a virtual object (e.g., clothes, jewelry, cars, etc) in the virtual worlds.

In one embodiment of the present invention, "credential information" of a user refers to a username (i.e., a unique set of characters identifying a user of a shared computer program, system, or network, which allows access when coupled with a password; also refers to a user name, user ID or login ID), a password (i.e., a secret word or phrase that a user uses to gain admittance or access to a shared computer program, system or network) and biometric data associated with a user, e.g., a fingerprint of the user, an iris scan of the user, a voice of the user and a facial scan of the user. Generally, the credential information is used for verifying whether a user is a valid user or registered user who can officially access a virtual world.

Figure 1:
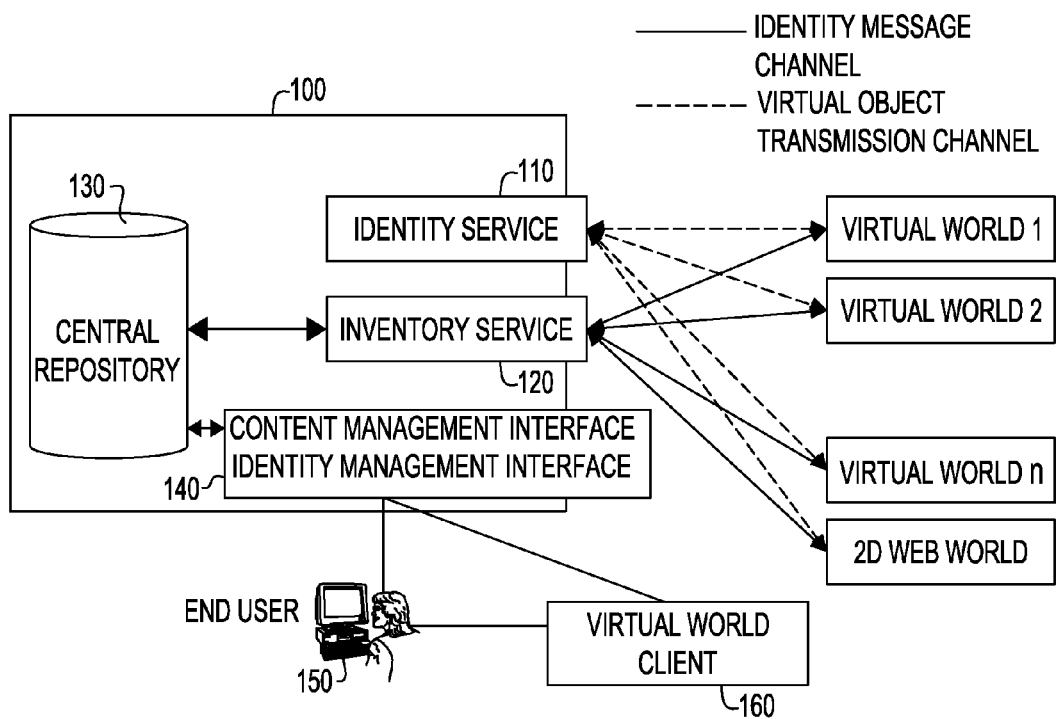
FIG. 1 illustrates a system diagram of one embodiment of the present invention.

FIG. 1 depicts a block diagram of one embodiment of the present invention. A system 100 includes an identity service module 110, an inventory service module 120, a central storage device (central repository) 130, a content management interface and an identity management interface 140. The system 100 is shared by a plurality of virtual worlds (e.g., virtual world 1, virtual world 2, virtual world n and 2D Web world (e.g., Facebook™)) and a plurality of virtual world client devices (e.g., a virtual world client device 160). In one embodiment, the virtual world client device is a computing device (e.g., a desktop computer, a laptop computer (e.g., IBM ThinkPad®), a PDA, a smartphone (e.g., Apple® iPhone™) including a web browser). In one embodiment, the web browser is a 3D web browser (e.g., 3B™). In another embodiment, the web browser is a 2D web browser (e.g., Microsoft® Internet Explorer®, Firefox™) with a 3D graphic engine (e.g., Torque Game Engine). In another embodiment, the virtual world client device is a wearable computer (i.e., a computer that is worn on a body of a user) that sends an operator (a user)'s motion/emotion/instruction to a virtual world (or a virtual world server hosting the virtual world) as an electronic signal via a wireless link, wired link and/or a network. In one embodiment, the plurality of the virtual worlds (or corresponding virtual world servers), the plurality of virtual world client devices and the system 100 are connected each other through physical links, wireless links or networks (e.g., ATM network).

In one embodiment of the present invention, a virtual world is hosted by one or more virtual world servers. In one embodiment, the virtual world server is a computing device (e.g., a mainframe, a desktop computer, a workstation, a laptop computer, etc.). In one embodiment, the virtual world server includes a database (e.g., Oracle®, IBM® Informix®) and/or a storage device (e.g., a magnetic disk, a hard disk, a optical disk, a compact disk, a digital versatile disk) to store and manage persistent data (e.g., virtual objects, credential information of registered users) of a corresponding virtual world. A SecondLife™ region server and OpenSIM (openSimulator) are examples of the virtual world server. In one embodiment, the virtual world server may be connected to more than one virtual world client device at a time.

In one embodiment, a user (e.g., an end user 150) accesses the system 100 through the virtual world client device (e.g., a virtual world client device 160). The user is a person who uses the virtual world client device to play or do business in virtual worlds or 2D web. The inventory service module 120 and the identity service module 110 are shared by the plurality of virtual worlds (or corresponding virtual world servers) and the plurality of virtual world client devices.

The identity service module 110 manages an authentication request (e.g., request to verify whether the user is a valid user who can access a virtual world) received from the user. In one embodiment, the identity service module 110 requires credential information from a user, when the user wants to access one of the "n" virtual worlds. Then, the user provides his/her credential information through the virtual world client device to the identity service module 110 via physical links, wireless links and/or networks. Upon receiving the credential information from the virtual world client device, the identity service module 110 generates a result of the authentication request, i.e., whether the user is a valid or registered user for one of the "n" virtual world. The result is determined by searching a database to find out whether the provided credential information can be found in the database which stores registered or valid users' authentication information (e.g., usernames, passwords, iris scan images, fingerprint images, voice records, facial scan images, phone number, addresses, email addresses, social security numbers, etc.). If the provided credential information is valid (i.e., the result of the authentication result is successful), the identity service module 110 contacts the virtual world (or a corresponding virtual world server) which the user wants to access, to provide an access grant (i.e., allowing the user to access the virtual world (or virtual world server)) to the user (or the virtual world client device of that user). Upon the virtual world (or the corresponding virtual world server) granting access to the user, the user through the virtual world client device can access the virtual world. When the provided credential information is not valid, the identity service module 110 contacts the user (or the virtual world client device that the user is using) to inform that the user provided an invalid credential information. In one embodiment, upon receiving the information (informing that the user provided invalid credential information), the user or the virtual world client device may provide credential information to the identity service module 110. In another embodiment, the user or the virtual world client device may stop accessing the virtual world (or the corresponding virtual world server).

The inventory service module 120 manages virtual properties (e.g., avatars, virtual objects (e.g., virtual clothes, virtual cars, virtual buildings), virtual assets) of a user. In one embodiment, the inventory service module 120 centrally manages all the virtual properties of the user. For example, upon a user's request, the inventory service module can delete a virtual property of the user. Upon a user's request, the inventory service module can transfer a virtual property of the user from a virtual world to another virtual world. In one embodiment, the inventory service module traces and records all the changes of the virtual properties (e.g., an ownership transfer of a virtual property; e.g., an expiration date of a temporary virtual object), e.g., by keeping all the changes in a database or a storage device. In one embodiment, when a user want to transmit a virtual property from a first virtual world (or a corresponding first virtual world server) to a second virtual world (or a corresponding second virtual world server), the inventory service module 120 contacts the identity service module 110 to verify whether the user is a valid user of the virtual worlds (e.g., the first virtual world and the second virtual world). Then, the identity service module 110 provides a result of an authentication request (e.g., verification of whether the user is valid user of the virtual worlds) to the inventory service module 120. Upon receiving the result of the authentication request, the inventory service module 120 transmits the virtual property from the first virtual world (or a corresponding first virtual world server) to the second virtual world (or a corresponding second virtual world server), if the result of the authentication request is successful. Otherwise, the inventory service module 120 sends an error message to the user. In another embodiment, the inventory service module 120 transmits a virtual property from a virtual world (or corresponding virtual world server) to other virtual worlds (or other corresponding virtual world servers), if a user requests and the identity service module 110 authorizes the transmission of the virtual property by verifying the user is an authorized user of the other virtual worlds.

The central storage device 130 communicates with the identity service module 110 and the inventory service module 120. The central storage device 130 stores and/or aggregates (e.g., combines) virtual properties of users and credential information of users. In one embodiment, the virtual properties of the users are provided to the central storage device 130 from the inventory service module 120. In one embodiment, the credential information of the users is provided to the central storage device 130 from the identity service module 110. The central storage device 130 is one or more of: a magnetic disk, an optical disk, a hard disk, a compact disk and a digital versatile disk.

In one embodiment, the identity service module 110 provides functionality enabling the system 100 to perform one or more of: an identity creation (e.g., creating a username and password), an identity enumeration (e.g., creating a list of identities (e.g., usernames, login IDs, passwords, etc.), an identity query (e.g., entering and/or responding to questions that may be asked to a user when the user can not remember a username or password), an identity deletion (e.g., deleting a username, password, etc.), an identity modification (e.g., changing a username, password, etc.) and an identity authentication (e.g., verifying whether an identity (e.g., a username or password) is valid or not).

In one embodiment, the central storage device 130 also communicates with the content management interface and the identity management interface 140. The identity management interface centrally manages (e.g., edit, create and delete) credential information of a user. Whenever the credential information is created or changed upon a user's request, the created or changed credential information is saved in the central storage device 130. The content management interface centrally manages (e.g., edit, create and delete) virtual properties of a user. Whenever the virtual properties are created or changed upon a user's request, the created or changed virtual property is saved in the central storage device 130. In one embodiment, the content management interface and identity management interface 140 is a graphical user interface (GUI) which is generated by the system 100 and provided from the system 100 to a virtual world client device (e.g., the virtual world client device 160), which the user 150 operates. The system 100 may communicate with the virtual world client 160 via the content management interface and identity management interface 140. The content management interface and identity management interface 140 assists the user to centrally manage his/her credential information or the virtual properties, e.g., by providing drop-down menus or providing pop-up windows.

In one embodiment, the content management interface module and identity management interface module 140 in the system 100 is implemented as hardware on a reconfigurable hardware (e.g., FPGA (Field Programmable Gate Array) or CPLD (Complex Programmable Logic Device)) using a hardware description language (Verilog, VHDL, Handel-C, or System C). In another embodiment, the content management module and identity management module 140 in the system 100 is implemented on a semiconductor chip (e.g., ASIC (Application-Specific Integrated Circuit)) using a semi custom design methodology (i.e., designing a chip using standard cells and a hardware description language).

In one embodiment, the content management module and identity management module 140 in the system 100 is implemented as software using a programming language (e.g., C, C++, Java, .NET, etc.). In one embodiment, the content management module and identity management module 140 in the system 100 are recorded in a computer readable medium (e.g., CD (Compact Disk), DVD (Digital Versatile Disc), HDD (Hard Disk Drive)) as an instruction (e.g., a machine language or assembly language) that is executed by a processor (e.g., Intel® Pentium®, IBM Power PC®, AMD® Operon®).

In one embodiment, the content management module and identity management module 140 in the system 100 is implemented as hardware through a computing device by being executed in the computing device. The computing device comprises, but is not limited to include, processor(s), memory(s), display device(s), input/output device(s) and network interface(s).

In one embodiment, the identity service module 110 communicates with a plurality of virtual worlds (or corresponding virtual world servers) or a 2D web (or 2D web server (e.g., HTTP server or Apache server)) via an identity message channel, as shown as broken lines in FIG. 1. The identity message channel can be a wired link, a wireless link and a network. The inventory service module 120 communicates with a plurality of virtual worlds (or corresponding virtual world servers) or a 2D web (or 2D web server (e.g., HTTP server or Apache server) via a virtual object transmission channel, as shown in FIG. 1. The virtual object transmission channel can be a wired link, a wireless link and a network.

In on embodiment of the present invention, a virtual world client device (e.g., a virtual world client device 160) receives inputs from a user (e.g., an end user 150) and communicates with a plurality of virtual world servers to access corresponding virtual worlds or to teleport virtual properties between different virtual worlds. When a virtual world server provides a response (e.g., access grant or access denial) to the virtual world client device, the virtual world client device processes the response and provides the response to the user, e.g., by displaying an access grant or denial message on a screen. The response from the virtual world server may be some text, multimedia data or some command for the virtual world client device to execute.

Figure 2:
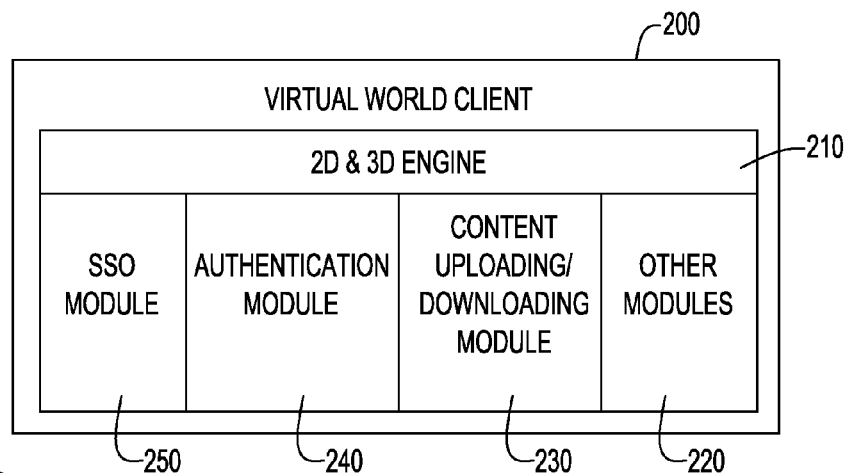
FIG. 2 illustrates a block diagram of a virtual world client device in one embodiment of the present invention.

In a further embodiment of the present invention, as shown in FIG. 2, the virtual world client device comprises a rendering engine 210, a content uploading/downloading module 230, an authentication module 240, a single-sign-on (SSO) module 250 and other modules 220. The rendering engine 210 processes 2D (two dimensional) or 3D (three dimensional) web pages. In one embodiment, the 2D or 3D web pages includes virtual properties. The rendering engine 210 may be a hybrid or integration of a web engine such as Firefox™ and a 3D engine such as Torque Game Engine.

A single-sign-on (SSO) module 250 tracks an already authenticated user (i.e., a user who provided credential information to the identity service module 1110 and the identity service module 110 verified that the user is a valid user who can access a plurality of virtual worlds or a virtual world) so as not to require the authenticated user to authenticate again (e.g., providing credential information again through a virtual world client device and verifying again whether the credential information is valid through the identity service module 110) for an access to a virtual world server or other virtual world servers. In one embodiment, the SSO module 250 enables a Single-Sign-On within a virtual world/2D web or a plurality of virtual worlds/2D webs. By implementing the Single-Sign-On, once a user provides credential information to the identity service module 110 and the provided credential information is proved as being valid, the user does not need to provide the credential information again to access that virtual world or any other virtual worlds. In one embodiment, when credential information of a user is verified by the identity service module 110, a virtual world server that granted an access to the user sends a token (e.g., a web cookie or HTTP cookie) to a virtual world client device that the user is using. When the same user wants to access other virtual worlds or same virtual world again, the virtual world client device that the user is using sends the token to the identity service module 110. Upon receiving the token from the virtual world client device, the identity service module 110 evaluates whether the token is valid or not, by checking whether numbers on the token are still valid. Then, the virtual world client device becomes an authorized user to access the same virtual world or other virtual worlds, if the sent token is valid. Otherwise, the identity service module 110 sends an access denial message to the virtual world client device.

The content uploading/downloading module 230 exchanges data (e.g., virtual properties or credential information) between virtual world client device(s), virtual world server(s), the identity service module 110 and the inventory service module 120. In one embodiment, the content uploading/downloading module 230 utilizes a protocol (e.g., TCP/IP, UDP (User Datagram Protocol), HTTP, Telnet, SSH (Secure Shell Remote Protocol), SMTP (Simple Mail Transfer Protocol), FTP (File Transfer Protocol), IMAP (Internet Message Access Protocol)) to exchange the data between virtual world client device(s), virtual world server(s), the identity service module 110 and the inventory service module 120. In one embodiment, the data is exchanged between virtual world client device(s), virtual world server(s), the identity service module 110 and the inventory service module 120 via a wireless link, a wired link or a network.

The authentication module 240 performs an authentication related function of users. The authentication related function comprises obtaining credential information of users and checking validity of credential information from users, e.g., by searching an internal database (not shown) in the virtual world client device to find out a matching valid record, obtaining fingerprints of users and checking validity of the fingerprints of the users, e.g., by searching an internal database in the virtual world client device to find out a matching valid record, obtaining iris scans of users and checking validity of the iris scans of the users, e.g., by searching an internal database in the virtual world client device to find out a matching valid record, obtaining facial scans of users and checking validity of the facial scans of the users, e.g., by searching an internal database in the virtual world client device to find out a matching valid record, and obtaining voices of users and checking validity of the users, e.g., by searching an internal database in the virtual world client device to find out a matching valid record.

The virtual world client device 200 may include other modules 220 such as a plugin management module (not shown). The plugin management module manages (e.g., add, edit, remove) software extensions (e.g., computer program designed to be incorporated into another piece of software in order to enhance or extend the functionalities of the software). The examples of the software extensions are Firefox™ plug-ins or Apache plug-ins.

In one embodiment, the rendering engine 210, the other modules 220, the content uploading/downloading module 230, the authentication module 240 and SSO module 150 in the virtual world client device 200 are implemented as hardware on a reconfigurable hardware (e.g., FPGA (Field Programmable Gate Array) or CPLD (Complex Programmable Logic Device)) using a hardware description language (Verilog, VHDL, Handel-C, or System C). In another embodiment, the rendering engine 210, the other modules 220, the content uploading/downloading module 230, the authentication module 240 and SSO module 150 in the virtual world client device 200 is implemented on a semiconductor chip (e.g., ASIC (Application-Specific Integrated Circuit)) using a semi custom design methodology (i.e., designing a chip using standard cells and a hardware description language).

In one embodiment, the rendering engine 210, the other modules 220, the content uploading/downloading module 230, the authentication module 240 and SSO module 150 in the virtual world client device 200 are implemented as software using a programming language (e.g., C, C++, Java, .NET, etc.). In one embodiment, the rendering engine 210, the other modules 220, the content uploading/downloading module 230, the authentication module 240 and SSO module 150 in the virtual world client device 200 are recorded in a computer readable medium (e.g., CD (Compact Disk), DVD (Digital Versatile Disc), HDD (Hard Disk Drive)) as an instruction (e.g., a machine language or assembly language) that is executed by a processor (e.g., Intel® Pentium®, IBM® Power PC®, AMD® Operon®).

In one embodiment, the rendering engine 210, the other modules 220, the content uploading/downloading module 230, the authentication module 240 and SSO module 150 in the virtual world client device 200 are implemented as hardware through a computing device by being executed in the computing device. The computing device comprises, but is not limited to include, processor(s), memory(s), display device(s), input/output device(s) and network interface(s).

Figure 3:
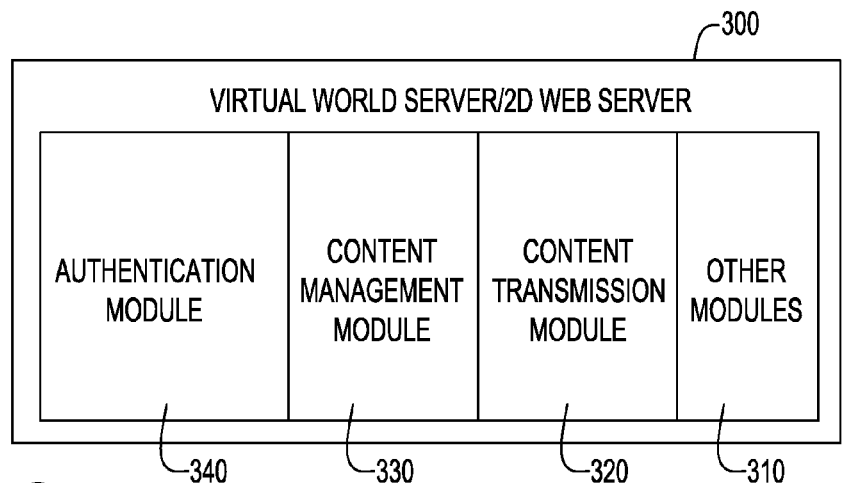
FIG. 3 illustrates a block diagram of a virtual world server in one embodiment of the present invention.

In one embodiment, a virtual world server communicates with the identity service module 110 and the inventory service module 120 to authorize logins of users and to teleport virtual properties between different virtual worlds. In one embodiment, as shown in FIG. 3, the virtual world server (e.g., a virtual world server 300) comprises a content management module 330, a content transmission module 320, an authentication module 340 and other modules 310.

The content management module 330 manages (e.g., delete, add, remove) the virtual properties of users, e.g., by deleting, adding, removing the virtual properties in the virtual world server 300 upon a request from the users. The content transmission module 320 manages transmission of the virtual properties of the users to a virtual world client device, an identity service module and an inventory service module, e.g., by utilizing a communication protocol (e.g., TCP/IP, UDP, HTTP, Telnet, SSH, SMTP, FTP and IMAP). Other modules 310 (e.g., a plugin management module) may be included in the virtual world server. The plugin management module manages (e.g., add, edit, remove) software extensions (e.g., computer program designed to be incorporated into another piece of software in order to enhance or extend the functionalities of the software). The examples of the software extensions are Firefox™ plug-ins or Apache plug-ins.

The authentication module 340 authenticates users who want to login a virtual world (e.g., virtual world 1 in FIG. 1). In one embodiment, the authentication module 340 may directly authenticate a request to login a virtual world with an identity storage device (e.g., an identity storage device 470 in FIG. 4) in the identity service module 110. (The identity storage device 470 is described in detail later.) In another embodiment, the authentication module 340 may delegate the authentication to the identity service module 110.

In one embodiment, the content transmission module 320, the content management module 330, the authentication module 340 and other modules 310 in the virtual world server 300 are implemented as hardware on a reconfigurable hardware (e.g., FPGA (Field Programmable Gate Array) or CPLD (Complex Programmable Logic Device)) using a hardware description language (Verilog, VHDL, Handel-C, or System C). In another embodiment, the content transmission module 320, the content management module 330, the authentication module 340 and other modules 310 in the virtual world server 300 is implemented on a semiconductor chip (e.g., ASIC (Application-Specific Integrated Circuit)) using a semi custom design methodology (i.e., designing a chip using standard cells and a hardware description language).

In one embodiment, the content transmission module 320, the content management module 330, the authentication module 340 and other modules 310 in the virtual world server 300 are implemented as software using a programming language (e.g., C, C++, Java, .NET, etc.). In one embodiment, the content transmission module 320, the content management module 330 and other modules 310 in the virtual world server 300 are recorded in a computer readable medium (e.g., CD (Compact Disk), DVD (Digital Versatile Disc), HDD (Hard Disk Drive)) as an instruction (e.g., a machine language or assembly language) that is executed by a processor (e.g., Intel® Pentium®, IBM® Power PC®, AMD® Operon®).

In one embodiment, the content transmission module 320, the content management module 330, the authentication module 340 and other modules 310 in the virtual world server 300 are implemented as hardware through a computing device by being executed in the computing device. The computing device comprises, but is not limited to include, processor(s), memory(s), display device(s), input/output device(s) and network interface(s).

Figure 4:
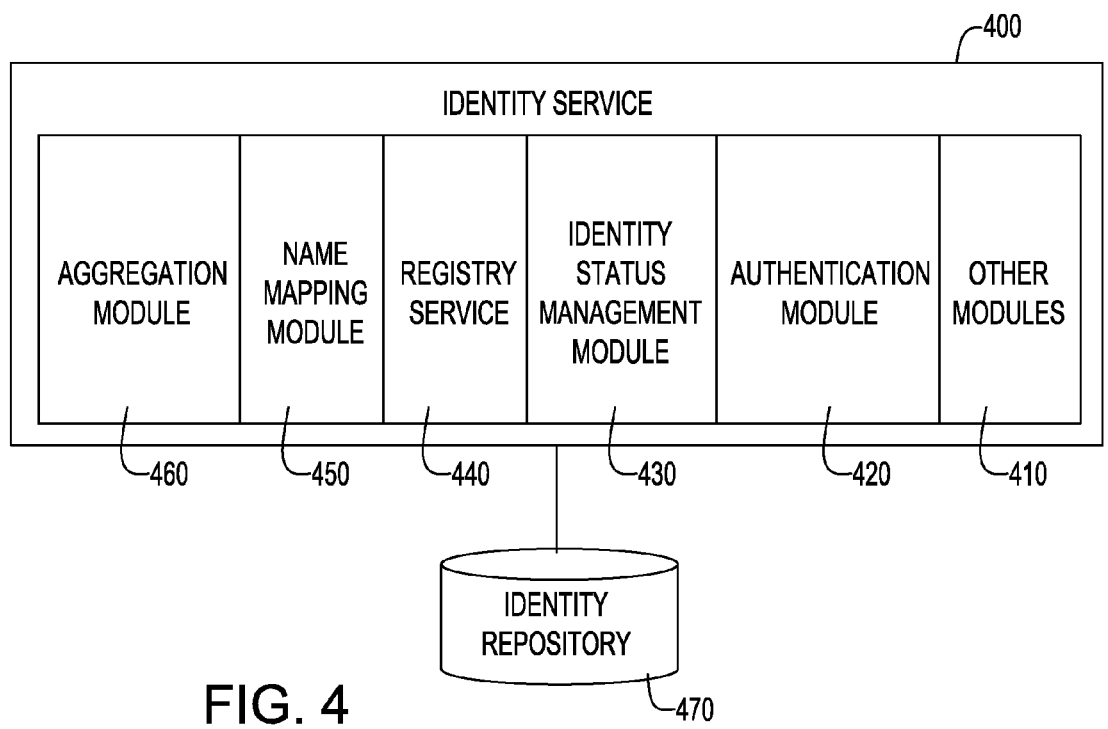
FIG. 4 illustrates a block diagram of an identity service module in one embodiment of the present invention.

In one embodiment, as shown in the FIG. 4, the identity service module 400 (identity service module 110 in FIG. 1) includes an authentication module 420, an identity status management module 430, a registry service module 440, a name mapping module 450, an aggregation module 460, one or more identity storage device 470 and other modules 410.

The identity storage device 470 stores credential information of users. In one embodiment, there are a plurality of identity storage devices. The identity storage device 470 is a magnetic disk, an optical disk, a hard disk, a compact disk or a Digital Versatile Disc. An aggregation module 460 is a module to aggregate (i.e., combines) the plurality of identity storage devices. In one embodiment, the plurality of identity storage devices appears as one logical storage device through the aggregation module 460. In one embodiment, the aggregation module 460 supports a data source level aggregation and a service level aggregation. The data source level aggregation means the aggregation module 460 directly accesses raw data in the one or more identity storage devices, i.e., without an assistance of an interface. The service level aggregation means the aggregation module 460 accesses raw data in the one or more identity storage devices, e.g., through API (Application Programming Interface) and/or GUI (Graphical User Interface).

The name mapping module 450 maps credential information to an ID (i.e., identity; username, login ID) used in the one or more identity storage devices 470, e.g., by a hash function. In one embodiment, each identity storage devices 470 has a unique ID. In another embodiment, the one or more identity storage devices 470 have a same ID.

In one embodiment, the name mapping module 450 includes a name mapping table like below:

TABLE 1

A name mapping table

| Username | Identity repository address | Mapped ID | Aggregation attribute |
| --- | --- | --- | --- |

The Username in the name mapping table is a universal user name shared across all the virtual world servers. The identity repository address (identity storage device address) in the name mapping table is an address to locate the one or more identity storage devices 470. The Mapped ID (identity) in the name mapping table is a user ID (identity) used in the one or more identity storage devices 470 to identify a verified user (i.e., a user who is authorized to play in a virtual world) or a registered user (i.e., a user who is officially recognized as a member in a virtual world). The aggregation attribute indicates constraints of the one or more identity storage devices 470. In one embodiment, the one or more identity storage devices 470 require only characters and numbers in their Mapped ID (identity). The aggregation attribute is used to express these constraints (e.g., requiring only characters and numbers in their Mapped ID). In one embodiment, the aggregation attribute is used to automatically generate credential information of a user in a virtual world, if credential information of the user has been validated in the identity service module 400 and the user does not have any valid credential information for the virtual world.

The authentication module 420 performs an authentication related function of users. The authentication related function comprises obtaining credential information of users and checking validity of credential information from users, e.g., by finding matching credential information in the plurality of identity storage devices 470, obtaining users' biometric information, e.g., fingerprints of users and checking validity of the fingerprints of the users, e.g., by finding matching fingerprints in the plurality of identity storage devices 470, obtaining iris scans of users and checking validity of the iris scans of the users, e.g., by finding matching iris scans in the plurality of identity storage devices 470, obtaining facial scans of users and checking validity of the facial scans of the users, e.g., by finding matching facial scans in the plurality of identity storage devices 470, and obtaining voices of users and checking validity of the users, e.g., by finding matching voices in the plurality of identity storage devices 470.

The identity status management module 430 tracks status of the users (e.g., whether a certain user on a certain virtual world client device has signed in to a certain server). In one embodiment, when a user wants to login to a virtual world, the user's credential information is communicated from for a receipt by the identity service module 400. Then, the identity service module 400 invokes the authentication module 420 to verify the credential information provided from the user, e.g., by searching the identity storage device 470 to find a valid matching record. Then, the authentication module 420 contacts the identity status management module 430 to inform whether the user becomes a verified user to login the virtual world or not. If the user becomes a verified user (e.g., his/her credential information is validated by the authentication module 420), the identity status management module 430 updates the user's status, e.g., as on-line user. Otherwise, the identity status management module 430 does not update the user's status. When the user sends a log off request to the identity service module 400 or the virtual world that the user is currently logged in, the identity status management module 430 changes the user's status, e.g., from the on-line user to an off-line user. Then, the virtual world server that the user is currently logged in terminates a connection between the virtual world (or corresponding virtual world server) and a virtual world client device that the user may use.

A registry service module 440 registers a new user for the plurality of virtual worlds (e.g., virtual world 1, virtual world 2, virtual world 3, . . . , and virtual world n in FIG. 1). When a user registers a virtual world, e.g., by visiting a web site of a virtual world and then clicking "Join" button (not shown), the identity service module 400 invokes a registry module 440 to ask the user to provide his/her information (e.g., address, email address, credit card number for membership purpose, name, etc.) and to create credential information, e.g., via a console, a pop-up window, a GUI, an API, etc. Then, the user provides his/her information and creates the credential information to register a virtual world. In one embodiment, when a user registers a virtual world, the user is also registered to the identity service module 400, e.g., by storing the provided information (e.g., address, name, credit card number) and created credential information in the identity storage device 470.

In one embodiment, there are other modules 410 such as a plugin management module. The plugin management module manages (e.g., add, edit, remove) software extensions (e.g., computer program designed to be incorporated into another piece of software in order to enhance or extend the functionalities of the software). The examples of the software extensions are Firefox™ plug-ins or Apache plug-ins.

In one embodiment, other modules 410, an authentication module 420, an identity status management module 430, a registry service module 440, a name mapping module 450 and an aggregation module 460 in the identity service module 400 are implemented as hardware on a reconfigurable hardware (e.g., FPGA (Field Programmable Gate Array) or CPLD (Complex Programmable Logic Device)) using a hardware description language (Verilog, VHDL, Handel-C, or System C). In another embodiment, other modules 410, an authentication module 420, an identity status management module 430, a registry service module 440, a name mapping module 450 and an aggregation module 460 in the identity service module 400 are implemented on a semiconductor chip (e.g., ASIC (Application-Specific Integrated Circuit)) using a semi custom design methodology (i.e., designing a chip using standard cells and a hardware description language).

In one embodiment, other modules 410, an authentication module 420, an identity status management module 430, a registry service module 440, a name mapping module 450 and an aggregation module 460 in the identity service module 400 are implemented as software using a programming language (e.g., C, C++, Java, .NET, etc.). In one embodiment, other modules 410, an authentication module 420, an identity status management module 430, a registry service module 440, a name mapping module 450 and an aggregation module 460 in the identity service module 400 are recorded in a computer recordable medium (e.g., CD (Compact Disk), DVD (Digital Versatile Disc), HDD (Hard Disk Drive)) as an instruction (e.g., a machine language or assembly language) that is executed by a processor (e.g., Intel® Pentium®, IBM® Power PC®, AMD® Operon®).

In one embodiment, other modules 410, an authentication module 420, an identity status management module 430, a registry service module 440, a name mapping module 450 and an aggregation module 460 in the identity service module 400 are implemented as hardware through a computing device by being executed in the computing device. The computing device comprises, but is not limited to include, processor(s), memory(s), display device(s), input/output device(s) and network interface(s).

Figure 5:
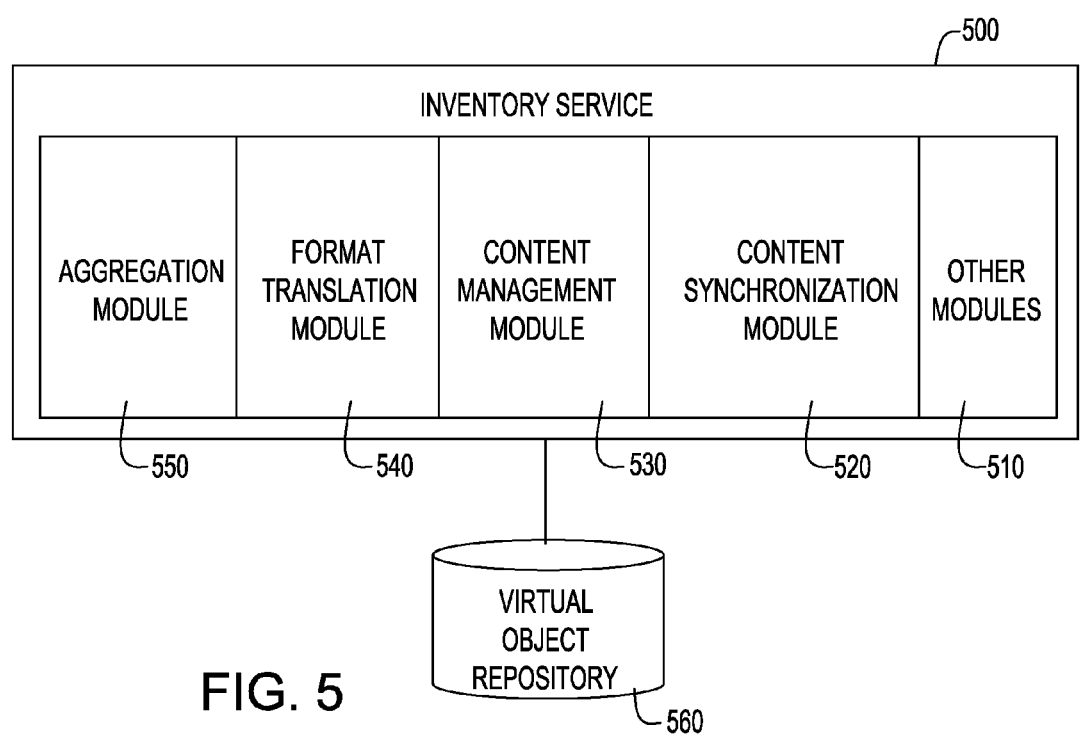
FIG. 5 illustrates a block diagram of an inventory service module in one embodiment of the present invention.

FIG. 5 illustrates a block diagram of the inventory service module 500 (the inventory service module 120 in FIG. 1). The inventory service module 500 comprises a content synchronization module 520, a management module 530, a format translation module 540, an aggregation module 550, one or more virtual object storage devices 560 and other modules 510. The one or more virtual property storage devices (virtual object repositories) 560 stores virtual properties of users. The one or more virtual property storage devices 560 includes, but are not limited to include, magnetic disks, optical disks, hard disks and compact disks. The aggregation module 550 aggregates (i.e., combines) the one or more virtual property storage devices 560. In one embodiment, the one or more virtual property storage devices 560 appears as one logical storage device through the aggregation module 550. In one embodiment, the aggregation module 550 supports a data source level aggregation and a service level aggregation. The data source level aggregation means the aggregation module 550 directly accesses raw data in the one or more virtual property storage devices, e.g., without an assistance of an interface. The service level aggregation means the aggregation module 460 accesses raw data in the one or more virtual property storage devices, e.g., through API (Application Programming Interface) and/or GUI (Graphical User Interface).

The format translation module 540 translates a format of a virtual property to another format. For example, the format translation module 540 translates from/to Collada (i.e., COLLAborative Design Activity; an interchange file format for 3D applications) to/from X3D (i.e., an ISO standard XML-based file format for representing 3D computer graphics). A content synchronization module 520 manages protocols to transmit data (e.g., virtual properties) from a virtual world to a virtual world client device or from the virtual world to the virtual world client device. The protocols include, but are not limited to include, TCP/IP, UDP, HTTP, Telnet, SSH, SMTP, FTP and IMAP. A content management module 530 is a module for deleting, editing and creating virtual properties. In one embodiment, the content management module 530 provides a console, an API and a GUI to assist a user to perform the deletion, modification and creation of the virtual properties.

In one embodiment, the inventory service module 500 includes other modules 510 such as a plugin management module. The plugin management module manages (e.g., add, edit, remove) software extensions (e.g., computer program designed to be incorporated into another piece of software in order to enhance or extend the functionalities of the software). The examples of the software extensions are Firefox™ plug-ins or Apache plug-ins.

In one embodiment, the other modules 510, the content synchronization module 520, the management module 530, the format translation module 540 and the aggregation module 550 in the inventory service module 500 are implemented as hardware on a reconfigurable hardware (e.g., FPGA (Field Programmable Gate Array) or CPLD (Complex Programmable Logic Device)) using a hardware description language (Verilog, VHDL, Handel-C, or System C). In another embodiment, the other modules 510, the content synchronization module 520, the management module 530, the format translation module 540 and the aggregation module 550 in the inventory service module 500 are implemented on a semiconductor chip (e.g., ASIC (Application-Specific Integrated Circuit)) using a semi custom design methodology (i.e., designing a chip using standard cells and a hardware description language).

In one embodiment, the other modules 510, the content synchronization module 520, the management module 530, the format translation module 540 and the aggregation module 550 in the inventory service module 500 are implemented as software using a programming language (e.g., C, C++, Java, .NET, etc.). In one embodiment, the other modules 510, the content synchronization module 520, the management module 530, the format translation module 540 and the aggregation module 550 in the inventory service module 500 are recorded in a computer recordable medium (e.g., CD (Compact Disk), DVD (Digital Versatile Disc), HDD (Hard Disk Drive)) as an instruction (e.g., a machine language or assembly language) that is executed by a processor (e.g., Intel® Pentium®, IBM® Power PC®, AMD® Operon®).

In one embodiment, the other modules 510, the content synchronization module 520, the management module 530, the format translation module 540 and the aggregation module 550 in the inventory service module 500 are implemented as hardware through a computing device by being executed in the computing device. The computing device comprises, but is not limited to include, processor(s), memory(s), display device(s), input/output device(s) and network interface(s).

Figure 6:
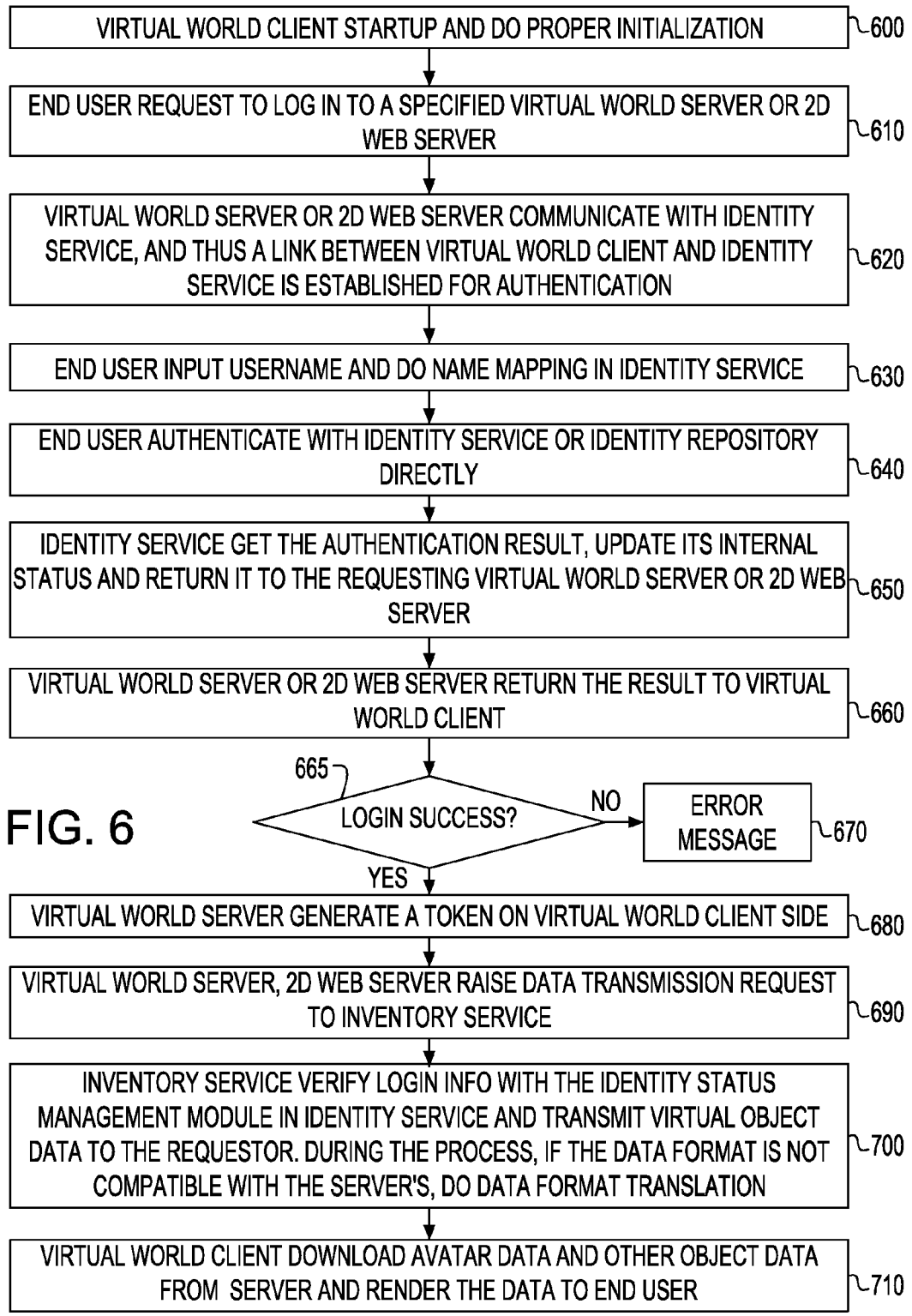
FIG. 6 illustrates a methodology for logging in to a virtual world server in one embodiment of the present invention.

FIG. 6 depicts a process to log in to a virtual world or a virtual world server hosting the virtual world by using the identity service module (e.g., FIG. 1. the identity service module 110 and/or FIG. 4. the identity service module 400) and the inventory service module (e.g., FIG. 1. the inventory service module 120 and/or FIG. 5. the inventory service module 500). In one embodiment, the virtual world server is a 3D web server (e.g., openSIM) hosting a 3D virtual world (e.g., SecondLife®). In another embodiment, the virtual world server is 2D web server (e.g., Apache HTTP server).

At step 600 in FIG. 6, a user, who wants to log in to a virtual world (or a corresponding a virtual world server), starts a virtual world client device and performs initialization (e.g., activating a graphic processor unit (e.g., Nvidia® GeForce™ 6600GT), activating a graphic card or a video card). At step 610, the user accesses the virtual world (or the corresponding virtual world server) to request to log in the virtual world (or the corresponding virtual world server), e.g., by typing a web address of the virtual world on a web browser (e.g., FireFox with a 3D graphic engine (e.g., Torque Game Engine)) included in the virtual world client device.

At step 620, the virtual world (or the corresponding virtual world server communicates with the identity service module 110 to authenticate whether the request to log in the virtual world (or the corresponding virtual world server) is valid or not. In one embodiment, upon receiving the request from the user or the virtual world client device that the user is using, the virtual world (or the corresponding virtual world server) contacts the identity service module 110 to check whether the user or the virtual world client device is on a blacklist (i.e., a list or register of persons who, for one or more reasons, are being denied a particular privilege, service, mobility, access or recognition in a virtual world), e.g., by asking the identity service module 110 to search its identity storage devices whether an IP address of the user or the virtual world client device has been marked as a hacker, e.g., one who tried to steal a virtual property by an unauthorized way. If the user or the virtual world client device has been on the blacklist, the virtual world (or corresponding virtual world server) immediately closes a connection between the user (or the virtual world client device that the user uses) and the virtual world (or the corresponding virtual world server) by increasing a security level to access the virtual world (or the corresponding the virtual world server).

If the user or the virtual world client device is not on the blacklist, the virtual world (or the corresponding virtual world server) asks the identity service module 110 to establish a link (e.g., a physical link, a wired link, a wireless link) between the user (e.g., the virtual world client device) and the identity service module 110 to proceed an authentication process (i.e., a process to validate a user to log in to a virtual world, e.g., by asking a username/password from a user and finding a matching username/password in a database associated with the virtual world) of the user or the virtual world client device.

The authentication process may begin by asking to the user or the virtual world client device to provide credential information. At step 630, the user or the virtual world client device provides his/her credential information to the identity service module 110, e.g., via a GUI. Then, the identity service module 110 invokes a name mapping module 450 to search one or more identity storage devices 470 and then to find out whether the provided credential information is valid, e.g., by finding a matching record associated with the provided credential information in one or more identity storage devices 470. In one embodiment, the name mapping module 450 maps the provided credential information to an ID (identity; e.g., a username) or a universal ID associated with the provided credential information, e.g., by using a hash function. In one embodiment, the hash function performs a deterministic mapping (i.e., always maps a same input to a same output) or a random mapping (i.e., may map a same input to a different output each time). At step 640, the ID or the universal ID is used to authenticate the provided credential information with the identity service module 400 and/or the one or more identity storage devices 470 directly. In one embodiment, the one or more identity storage devices 470 may retrieve a corresponding record associated with the ID or the universal ID and then the authentication module 420 in the identity service module 400 performs an authentication related function (e.g., checking a membership status of the user associated with the ID or the universal ID; e.g., authenticating the provided credential information by finding a valid membership record associated with the ID or the universal ID).

In another embodiment, if the provided credential information is biometric data such as fingerprints or iris scans, the inventory service module 110 invokes an authentication module 420 to verify the biometric data, e.g., by trying to find a matching biometric record, e.g., a matching iris scan image, in one or more identity storage device 470. For example, if an iris scan provided as credential information matches an iris scan image of a valid user stored in the one or more identity storage devices 470, the provided iris scan is validated as valid credential information.

Returning to FIG. 6, once the authentication module 420 in the identity service module 400 generates a result of the authentication process by performing the authentication related function, at step 650, the identity service module 400 invokes the identity status management module 430 to update a status of the user, who becomes a valid user via the authentication process. The identity status management module 430 may change the status of the user from being an off-line to an on-line state, after the authentication module 420 authorizes the user to play in the virtual world (or the corresponding virtual world server). The generated result of the authentication process may be returned to the corresponding virtual world server or 2D web server hosting the virtual world by the authentication module 420 in the identity service module 400.

At step 660, the virtual world (or the corresponding virtual world server), which received the result of the authentication process from the authentication module 420, forwards the result of the authentication process to the user (or the virtual world client device). In one embodiment, at step 665, the authentication module 420 enable the virtual world client device to displays the result of the authentication process. If the result of the authentication process indicates a login failure (i.e., the provided credential information at step 630 is evaluated as an invalid credential information by the authentication module 420), at step 670, the virtual world client device displays an error message (e.g., a message indicating a login failure) to the user.

At step 680, if the result of the authentication process indicates a login success (i.e., the provided credential information is evaluated as a valid credential information by the authentication module 420), the virtual world client device displays a login success message to the user. The virtual world (or the corresponding virtual world server) provides a token (e.g., HTTP cookie (i.e., parcels of text sent by a virtual world server to a virtual world client device and then sent back unchanged by the virtual world client device each time when the virtual world client device accesses that virtual world server)) to the virtual world client device that the user is using.

At step 690, the virtual world (or the virtual world server) requests data transmission (e.g., virtual properties of the user) from the inventory service module 500 to the virtual world (or the virtual world server). In one embodiment, the data transmission is performed by one or more of: an email, FTP, an instant messaging, etc. Upon receiving the request of the data transmission, the inventory service module 500 contacts the identity service module 400 to verify whether the authentication resulted in a login success. Thus, as shown at step 700, the inventory service module 500 contacts an identity status management module 430 to check whether the user (or the virtual world client device) is a valid on-line user. If the identity status management module 430 reports that the status of the user is off-line or invalid (e.g., a membership is expired while logged in), the inventory service module 500 does not transmit the data (e.g., a virtual property) to the virtual world or the corresponding virtual world server. The inventory service module 500 may send an error message (e.g., a message indicating the user becomes off-line) to the virtual world or the corresponding virtual world server.

At step 700, if the status of the user is verified, e.g., by receiving a message from the identity status management 430 that indicates the user or the virtual world client device is a valid on-line user, the inventory service module 500 transmits data (e.g., virtual properties of the user) to the virtual world (or the corresponding virtual world server). In one embodiment, before transmitting the data to the virtual world (or the corresponding virtual world server), the inventory service module 500 may perform format translation of the data to convert the data to a compatible data format in the virtual world (or the corresponding virtual world server). The format translation may be performed by the format translation module 540.

At step 710, the virtual world server provides the transmitted data (e.g., an avatar or other virtual properties of the user) to the virtual world client device that the user is using. Then, the virtual world client device presents the transmitted data on a screen to the user.

In one embodiment, in steps 620-640, if the user (or the virtual world client device) trusts the virtual world (or the corresponding virtual world server), the user (or the virtual world client device) transmits credential information to the virtual world (or the corresponding virtual world server. Then, virtual world (or the corresponding virtual world server) authenticates the user (or the virtual world client device), e.g., by providing the credential information to the identity service module 400 and obtaining a result of the credential info illation from the identity service module 400. Then, the virtual world (or the corresponding virtual world server) provides the result of the credential information to the user (or the virtual world client device).

Figure 7:
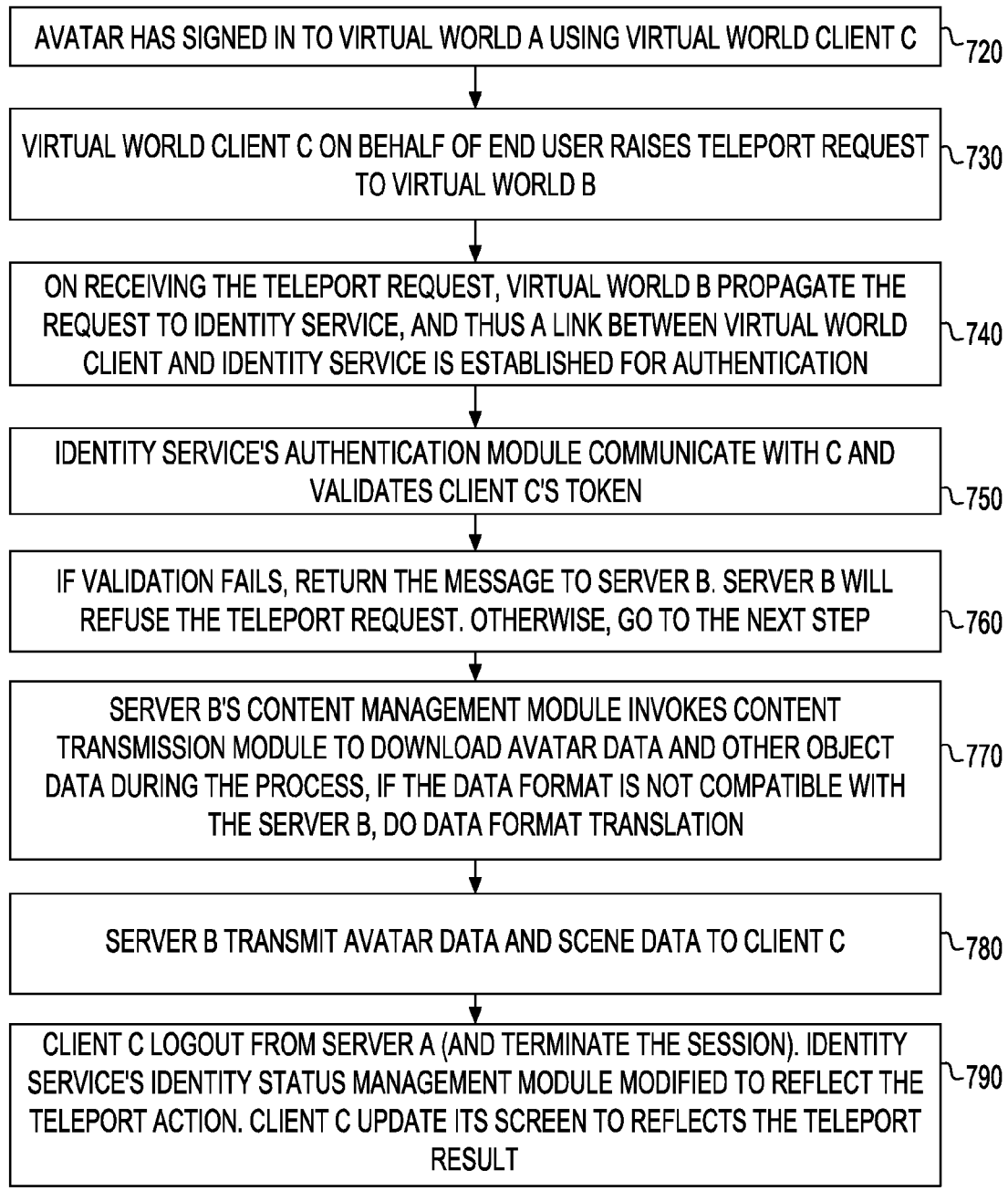
FIG. 7 illustrates a methodology for teleporting a virtual property from a virtual world to another virtual world in one embodiment of the present invention.

FIG. 7 depicts a flow chart for teleporting a virtual property from a first virtual world to a second virtual world by using an identity service module 400. In one embodiment, there is at least one virtual world server hosting the first virtual world. The virtual world server hosting the first virtual world is called a first virtual world server. There is also at least one virtual world server hosting the second virtual world. The virtual world server hosting the second virtual world is called a second virtual world server.

At step 720, a user accesses a first virtual world via his/her virtual world client device. On the virtual world client device, the user may appear as an avatar in the first virtual world. The first virtual world, which may be displayed on virtual world client device, may include scenes, buildings, cars, trees, other avatars, cellular phones, planes, etc.

At step 730, the user (or the virtual world client device that the user is using) requests teleportation (i.e., moving a matter or information from one point to another point) of a virtual property (e.g., an avatar) from the first virtual world (or the first virtual world server) to the second virtual world (or the second virtual world server). At step 740, upon receiving the request for the teleportation, the second virtual world (or the second virtual world sever) propagates or forwards the request to the identity service module 400. At step 740, upon receiving the request (for the teleportation), the identity service module 400 establishes a link (i.e., a communication path; e.g., a wireless link, wired link, a physical link) between the identity service module 400 and the user (or the virtual world client device) to process an authentication of the user for accessing the second virtual world (or the second virtual world server).

At step 750, the authentication module 420 in the identity service module 400 is invoked to process the authentication of the user. In one embodiment, the authentication module 420 evaluates whether the user or the virtual world client device has a valid token (e.g., a valid HTTP cookie, an access token (i.e., a numerical object used for a security login process and for identifying a valid user)), e.g., by communicating with the user or the virtual world client device via a link (e.g., a physical link, a wireless link, a wired link or a network). In another embodiment, the authentication module 420 evaluates whether the user is a valid user registered to the second world or the second world server by performing an authentication related function (e.g., checking whether the IP address of the user or the virtual world client device is registered as a valid user or virtual world client device).

If the authentication module 420 found out that the virtual world client device did not have the valid token, at step 760, the authentication module 420 sends a message to the second virtual world or the second virtual world server to inform that the second virtual world or the second virtual world server needs to reject the request (for the teleportation from the first virtual world to the second virtual world). In another embodiment, the identity service module 400 where the authentication module 420 is included sends an error message (e.g., a message indicating the user is not a valid user who can play in the second virtual world) to the second virtual world or the second virtual world server, if the authentication module 420 determines that the virtual world client device did not have the valid token, e.g., by checking an expiration date of a token that the user or the virtual world client device has. Upon receiving the error message from the identity service module 400 or the authentication module 420, the second virtual world or the second virtual world server rejects the request (for the teleportation).

If the user or the virtual world client device has the valid token, the identity service module 400 or the authentication module 420 sends a successful message (e.g., a message indicating the user or the virtual world client device is a valid user who can play in the second virtual world; e.g., a message indicating the user or the virtual world client device has the valid token) to the second virtual world and/or the first virtual world. Upon receiving the successful message, the first virtual world or the first virtual world server transmits a virtual property (e.g., avatar data (i.e., avatar geometry, avatar texture) and virtual assets or objects owned by the avatar) to the second virtual world or the second virtual world server.

In one embodiment, at step 770, a content management module of the first virtual world server transmits the virtual property to the second virtual world or the second virtual world server. Then, a content management module of the second virtual world server invokes a content transmission module to receive the virtual property from the first virtual world server. In one embodiment, if data format of the virtual property is not compatible with the second virtual world server, the content management module of the first virtual world server invokes the format translation module 540 in the inventory service module 500 to convert the data format of the virtual property to compatible data format of the second virtual world server. After converting the data format of the virtual property to the compatible data format of the second virtual world server, the content transmission module of the first virtual world server transmits the converted virtual property to the second virtual world server.

After receiving the virtual property, at step 780, the second virtual world or the second virtual world server transfers the received virtual property and relevant scene data (i.e., data for presenting a scene of a virtual world) to the user or the virtual world client device. In one embodiment, based on the valid token that the virtual world client device has, the identity service module 400 informs to the second virtual world (or the second virtual world server) that the virtual world client device has an up-to-date virtual properties in a cache (not shown). Then, the second virtual world or the second virtual world server does not send the received virtual property to the virtual world client device. The second virtual world or the second virtual world server only sends the relevant scene data to the user or the virtual world client device.

At step 790, the user may exit the first virtual world server. In one embodiment, a pop-up window (not shown) may be displayed on the virtual world client device to ask whether the user wants to sign out (i.e., log out) from the first virtual world, when the second virtual or the second virtual world server starts to transfer the received virtual property and the relevant scene data to the user or the virtual world client device. In another embodiment, the first virtual world or the first virtual world server terminates connection with the user (or the virtual world client device) if the second virtual world or the second virtual world server acknowledges that the second world or the second virtual world server received the virtual property.

Then, in one embodiment, the identity service module 400 invokes the identity status management module 430 to reflect the transmitting the virtual property from the first virtual world (or the first virtual world server) to the second virtual world (or the second virtual world server), the signing out from the first virtual world and the transferring the transmitted virtual property from the second virtual world (or the second virtual world server) to the user (or the virtual world client device). Then, the identity status management module 430 records a current status of the user (e.g., logged out from the first virtual world and logged in the second virtual world) in the identity storage device 470.

Then, the virtual world client device displays the transmitted virtual property (e.g., avatar data) and the relevant scene data on a screen. That is, an avatar representing the user in a virtual world disappears from the first virtual world and appears in the second virtual world. The second virtual world or the second virtual world server may provide an updated token to the user or the virtual world client device to reflect the successful teleportation (i.e., an avatar disappears from the first virtual world and appears in the second virtual world).

In one embodiment, at step 770, the second virtual world or the second virtual world server receives the virtual property from the inventory service module 500. Once the user is validated by the authentication module 420 as a valid user who can play in the second virtual world, then the inventory service module 500 invokes the content synchronization module 520 to transmit the virtual property of the user to the second virtual world or the second virtual world server.

Figure 8:
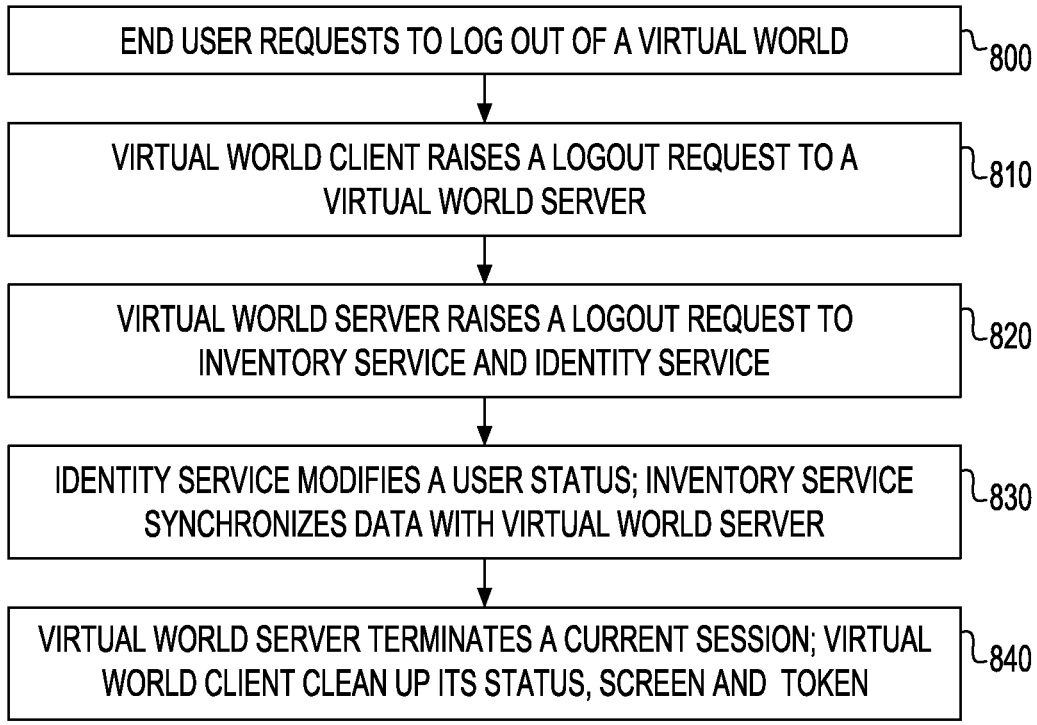
FIG. 8 illustrates a methodology for logging out of a virtual world server in one embodiment of the present invention.

FIG. 8 depicts a flow chart for logging out from a virtual world by using the identity service module 400 and the inventory service module 500. At step 800, a user or a virtual world client device that the user may operate requests a logout (i.e., closing off the user's access to the virtual world or the virtual world server) from a virtual world or a virtual world server hosting the virtual world, e.g., by clicking "log out" button (not shown) in a GUI. After the user or the virtual world client device requests the logout from the virtual world or the virtual world server, at step 810, the virtual world or the virtual world server receives the logout request.

At step 820, the virtual world or the virtual world server forwards the logout request to the identity service module 400 and the inventory service module 500. At step 830, the inventory service module 400 invokes the identity status management module 430 to update a status of the user or the virtual world client device, e.g., by changing his/her status from an on-line user to an off-line user. At the same time, the inventory service module 500 invokes the content synchronization module 520 to synchronize data (e.g., receives up-to-date virtual properties from the virtual world or the virtual world server) with the virtual world or the virtual world server.

At step 840, after the identity status management module 430 has completed updating the status of the user and the content synchronization module 520 has completed synchronizing the data with the virtual world or the virtual world server, the identity status management module 430 and/or the content synchronization module 520 contacts the virtual world or the virtual world server to terminate the user's current session (e.g., terminates a connection between the virtual world/virtual world server and the user/the virtual world client device). Then, the virtual world or the virtual world server authorizes the logout request from the user or the virtual world client device. A connection between the virtual world (or the corresponding virtual world server) and the user (or the virtual world client device) is disconnected. Then, the virtual world client device erases a screen that displayed the virtual world and/or removes a token from the virtual world server.

Figure 9:
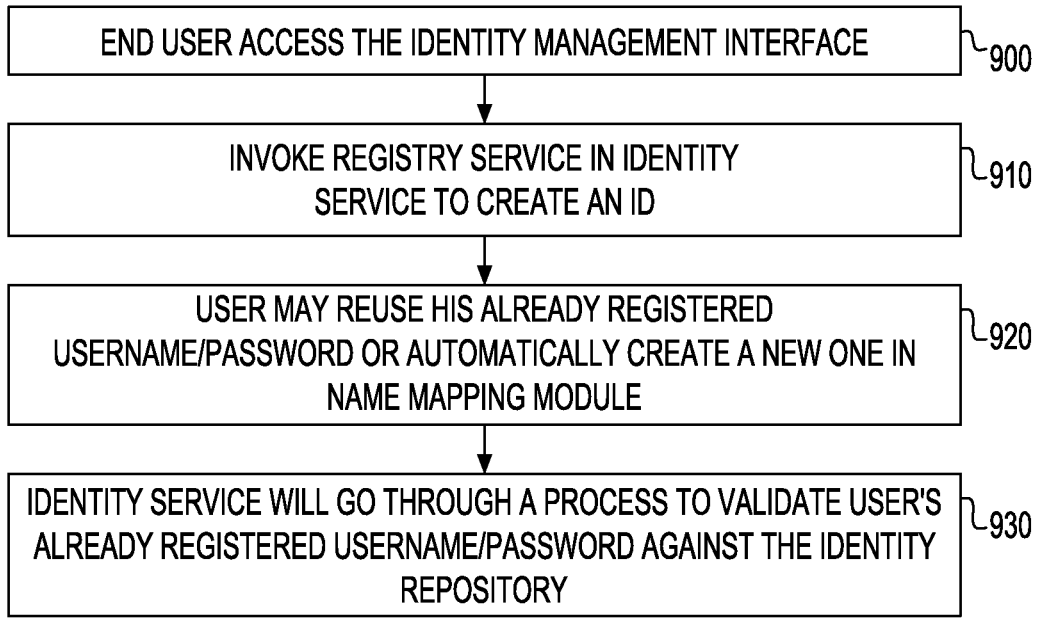
FIG. 9 illustrates a methodology for adding a user into an identity service module in one embodiment of the present invention.

FIG. 9 depicts a flow chart of adding a user to the identity service module 400. At step 900, a user or a virtual world client device that the user operates accesses the identity management interface 140 to create credential information of the user. At step 910, the identity management interface 140 invokes the registry service module 440 in the identity service module 400 to request creating credential information of the user. Then, the registry service module 440 checks whether the user has registered credential information (e.g., previously registered credential information that became void due to membership expiration). If the user had registered credential information before, at step 920, the user is asked whether the user wants to reuse the registered credential information, via a pop-up window (not shown). If the user agrees with reusing the registered credential information, at step 930, the identity service module 400 validates (e.g., by renewing the membership of the user) the registered credential information and records the registered credential information in the identity storage device 470 as a valid credential information associated with the user.

If the user does not have registered credential information (e.g., a new user) or the user does not want to use the registered credential information, at step 920, the identity service module may invoke the name mapping module 450 to assist the user to create new credential information, e.g., by providing drop-down menus on GUI. In one embodiment, the name mapping module 450 automatically creates the new credential information for the user. The new credential information is also mapped to a universal user name in the name mapping table (e.g., Table 1). Then, at step 930, the new credential information becomes valid credential information, e.g., by recording the new credential information in the identity storage device 470 as valid credential information associated with the user.

One of ordinary skill in the art understand that the flow chart illustrated in FIG. 9 can be modified to reflect changing credential information of a user and removing credential information of a user.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, .Net, Binary code) executed by a processor (e.g., Intel® Core™ 2, IBM® PowerPC®) for causing a computer to perform method steps of this invention. The present invention may include a method of deploying a computer program product including a program of instructions in a computer readable medium for one or more functions of this invention, wherein, when the program of instructions is executed by a processor, the compute program product performs the one or more of functions of this invention.

In addition, the present invention may be implemented on a computer readable medium (e.g., a magnetic disk, hard disk, optical disk, compact disk, digital versatile disk) embodying computer program instructions being executed by a processor for causing a computer to perform method steps of this invention. The present invention includes a method of deploying a computer program product including a program of instructions in a computer readable medium, wherein, when the program of the instructions is executed by a processor, the computer program product performs one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art

What is claimed is:

1. A system for centrally managing credential information of one or more users and virtual properties of the one or more users across a plurality of virtual worlds, comprising:
   an identity service module for receiving authentication requests and the credential information of the one or more users from the one or more users, the received authentication requests causing the identity service module to perform steps of:
   evaluating whether the one or more users are on a list of users who have been denied one or more of: a privilege, a service, an access to, or a recognition from one or more of the plurality of virtual worlds, and
   determining whether IP addresses associated with the one or more users were used to take the virtual properties in an unauthorized way from the one or more of the plurality of virtual worlds,
   the identity service module, based on the evaluating and determining, generating a result of each authentication request, the result indicating whether the one or more users are valid users or invalid users of the plurality of virtual worlds,
   the identity service module, upon the result indicating that the one or more users are invalid users of the plurality of virtual worlds, preventing a connection of the one or more users to the one or more of the plurality of virtual worlds if the one or more invalid users are on the list or the IP addresses were used to take the virtual properties in the unauthorized way,
   an inventory service module for receiving the result of the each authentication request from the identity service module and transmitting the virtual properties to at least one virtual world server associated with the plurality of virtual worlds if the results of the each authentication request indicates that the one or more users are valid users;
   the at least one virtual world server communicating with the identity service and the inventory service to authorize logins of the one or more users and teleporting the virtual properties between the plurality of virtual worlds upon the authorization of the logins of the one or more users; and
   a central storage device for communicating with the inventory service module and storing the virtual properties provided from the inventory service module and the credential information provided from the identity service module.

2. The system according to claim 1, wherein the identity service module performs one or more of: an identity creation, an identity enumeration, an identity query, an identity deletion, an identity modification and an identity authentication.

3. The system according to claim 1, further comprising:
   an identity management interface for centrally managing, editing, creating and deleting the credential information of the one or more users; and
   a content management interface for centrally managing, editing, creating and deleting the virtual properties of the one or more users.

4. The system according to claim 1, wherein the credential information of the one or more users comprises one or more of: a username, password, fingerprint, iris scan, voice and facial scan.

5. The system according to claim 1, wherein the identity service module comprises:
   at least one identity storage device for storing the credential information of the one or more users;

an aggregation module for aggregating the at least one identity storage device;
a name mapping module for mapping the credential information to an ID (identity) used in the at least one identity storage device;
an identity status management module for tracking status of the one or more users; and
a registry service module for registering a new user.

6. The system according to claim 5, wherein the aggregation module performs one or more of: a data source level aggregation and a service level aggregation.

7. The system according to claim 5, wherein the name mapping module comprises a name mapping table including one or more of: a universal user name shared across the at least one virtual world server, an address of the at least one identity storage device, a user ID (identity) used in the at least one identity storage device and an aggregation attribute indicating constraints of the at least one identity storage device.

8. The system according to claim 1, wherein the inventory service module comprises:
at least one virtual property storage device for storing the virtual properties of the one or more users;
an aggregation module for aggregating the at least one virtual property storages;
a format translation module for translating formats of the virtual properties to other formats;
a content synchronization module for managing protocols to transmit data from the at least one virtual world server to a virtual world client device or from the virtual world client device to the at least one virtual world server; and
a content management module for editing, creating and deleting the virtual properties.

9. The system according to claim 1, further comprising:
at least one virtual world client device for receiving inputs from the one or more users, communicating with the at least one virtual world server, processing responses of the virtual world servers and providing the responses to the one or more users.

10. The system according to claim 9, wherein the at least one virtual world client device comprises:
a rendering engine for processing a 2D (two dimensional) or 3D (three dimensional) web pages including the virtual properties;
a single-sign-on (SSO) module for tracking an already authenticated user as not to require the already authenticated user to authenticate again for an access to the at least one virtual world server;
a content uploading/downloading module for exchanging data between the at least one virtual world client device, the at least one virtual world server, the identity service module and the inventory service module;
an authentication module for performing an authentication related function of the one or more users.

11. The system according to claim 10, wherein the authentication related function comprises one or more of: obtaining credential information from the one or more users and checking validity of the credential information from the one or more users, obtaining fingerprints of the one or more users and checking validity of the fingerprints, obtaining iris scans of the one or more users and checking validity of the iris scans, obtaining facial scans of the users and checking validity of the facial scans, obtaining voices of the one or more users and checking validity of the voices.

12. The system according to claim 1, wherein the at least one virtual world server comprises:
a content management module for managing the virtual properties of the one or more users;
a content transmission module for managing transmission of the virtual properties to at least one virtual world client device, the identity service module and the inventory service module.

13. The system according to claim 1, wherein the central storage device aggregates the virtual properties and the credential information.

14. A method for accessing a virtual world server via a virtual world client device, the method comprising:
receiving from the virtual world client device a request to log in to the virtual world server;
establishing a communication link between the virtual world server and an identity service module that authenticates whether the request is valid or not and then to establish another communication link between the virtual world client device and the identity service module for the authentication;
receiving, at the identity service module, credential information from the virtual world client device and mapping the credential information to an ID (identity) in the identity service module to authenticate the credential information with the identity service module, the authenticating the credential information including steps of:
evaluating whether the credential information or the ID is on a list of users who have been denied one or more of: a privilege, a service, an access to, or a recognition from the virtual world server, and
determining whether IP address associated with the virtual world client device was used to take virtual properties in an unauthorized way;
generating, at the identity service module, based on the evaluating and the determining, a result of authenticating the credential information;
receiving, at the virtual world server, the generated result of authenticating the credential information;
providing the generated result from the virtual world server to the virtual world client device;
determining whether the generated result indicates log in success or failure;
displaying an error message on the virtual world client device, if the generated result indicates a login failure;
disconnecting the established communication link with the virtual world client device if the login failure is due to that the credential information or the ID is on the list or the IP address associated with the virtual world client device is used to take the virtual properties in the unauthorized way;
communicating with the identity service to authorize a login of the virtual client device and to authorize teleporting of virtual properties associated with the virtual client device between a plurality of virtual worlds if the generated result indicates a login success;
providing a token from the virtual world server to the virtual world client device,
if the generated result indicates the login success;
requesting, at the virtual world server, data transmission from the inventory service module to the virtual world server;
verifying, at the inventory service module, whether the generated result was the login success;
transmitting virtual object data from the inventory service module to the virtual world server upon verifying that the generated result was the login success; and
providing the transmitted data from the virtual world server to the virtual world client device for presentation and display thereof.

15. A method for teleporting a virtual property of a user from a first virtual world to a second virtual world by using an identity service module, the first virtual world being associated with a first virtual world server, the second virtual world being associated with a second virtual world server, the method comprising:
- accessing the first virtual world via a virtual world client device;
- requesting a teleportation of the virtual property from the first virtual world server to the second virtual world server;
- upon receiving the teleportation request at the second virtual world server, propagating the teleportation request from the second virtual world server to the identity service module;
- establishing a link between the virtual world client device and the identity service module for an authentication of the virtual world client device;
- evaluating whether the virtual world client device has a valid token by communicating between the virtual world client device and the identity service module via the link, the evaluating including steps of:
  - evaluating whether the virtual world client is on a list of users who have been denied one or more of: a privilege, a service, an access to, or a recognition from the first virtual world server or the second virtual world server, and
  - determining whether IP address associated with the virtual world client device was used to take other virtual properties in an unauthorized way;
- determining that the virtual world client device does not have the valid token in response to determining that the virtual world client is on the list or the IP address associated with the virtual world client device was used to take the other virtual properties in the unauthorized way;
- if the virtual world client device does not have the valid token, sending an error message from the identity service module to the second virtual world server;
- upon receiving the error message at the second virtual world server, rejecting the teleportation request at the second virtual world server;
- if the virtual world client has the valid token, communicating with the identity service to authorize a login of the virtual client device and to authorize teleporting of the virtual property between the first virtual world server and the second virtual world server;
- if the virtual world client device has the valid token, transmitting the virtual property from the first virtual world server to the second virtual world server;
- transferring the transmitted virtual property from the second virtual world to the virtual world client device;
- exiting the first virtual world server via the virtual world client device;
- updating the identity service module to reflect the transmitting, the transferring and the exiting; and
- displaying the transmitted virtual property in the second virtual world via the virtual world client device.

16. A non-transitory computer readable medium embodying computer program instructions being executed by a processor for causing a computer to perform method steps for logging in to a virtual world server by using an identity service module and an inventory service module, said method steps comprising:
- receiving from the virtual world client device a request to log in to the virtual world server;
- establishing a communication link between the virtual world server and the identity service module that authenticates whether the request is valid or not and then to establish another communication link between the virtual world client device and the identity service module for the authentication;
- receiving, at the identity service module, credential information from the virtual world client device and mapping the credential information to an ID (identity) in the identity service module to authenticate the credential information with the identity service module, the authenticating the credential information including steps of:
  - evaluating whether the credential information or the ID is on a list of users who have been denied one or more of: a privilege, a service, an access to, or a recognition from the virtual world server, and
  - determining whether IP address associated with the virtual world client device was used to take virtual properties in an unauthorized way;
- generating, at the identity service module, based on the evaluating and the determining, a result of authenticating the credential information;
- receiving, at the virtual world server, the generated result of authenticating the credential information;
- providing the generated result from the virtual world server to the virtual world client device;
- determining whether the generated result indicates log in success or failure;
- displaying an error message on the virtual world client device, if the generated result indicates a login failure;
- disconnecting the established communication link with the virtual world client device if the login failure is due to that the credential information or the ID is on the list or the IP address associated with the virtual world client device is used to take the virtual properties in the unauthorized way;
- communicating with the identity service and the inventory service to authorize a login of the virtual client device and to authorize teleporting of virtual properties associated with the virtual client device between a plurality of virtual worlds if the generated result indicates a login success;
- providing a token from the virtual world server to the virtual world client device, if the generated result indicates the login success;
- requesting, at the virtual world server, data transmission from the inventory service module to the virtual world server;
- verifying, at the inventory service module, whether the generated result was the login success;
- transmitting virtual object data from the inventory service module to the virtual world server upon verifying that the generated result was the login success; and
- providing the transmitted data from the virtual world server to the virtual world client device for presentation and display thereof.

17. A non-transitory computer readable medium embodying computer program instructions being executed by a processor for causing a computer to perform method step, the method steps comprising:
- accessing a first virtual world via a virtual world client device, the first virtual world being associated with a first virtual world server;
- requesting a teleportation of the virtual property from the first virtual world server to a second virtual world server, the second virtual world server being associated with a second virtual world;

upon receiving the teleportation request at the second virtual world server, propagating the teleportation request from the second virtual world server to an identity service module;

establishing a link between the virtual world client device and the identity service module for an authentication of the virtual world client device;

evaluating whether the virtual world client device has a valid token by communicating between the virtual world client device and the identity service module via the link, the evaluating including steps of:

evaluating whether the virtual world client is on a list of users who have been denied one or more of: a privilege, a service, an access to, or a recognition from the first virtual world server or the second virtual world server, and determining whether IP address associated with the virtual world client device was used to take other virtual properties in an unauthorized way;

determining that the virtual world client device does not have the valid token in response to determining that the virtual world client is on the list or the IP address associated with the virtual world client device was used to take the other virtual properties in the unauthorized way;

if the virtual world client device does not have the valid token, sending an error message from the identity service module to the second virtual world server;

upon receiving the error message at the second virtual world server, rejecting the teleportation request at the second virtual world server;

if the virtual world client device has the valid token, teleporting the virtual property from the first virtual world server to the second virtual world server;

transferring the teleported virtual property from the second virtual world to the virtual world client device;

exiting the first virtual world server via the virtual world client device;

updating the identity service module to reflect the transmitting, the teleporting and the exiting; and displaying the transmitted virtual property in the second virtual world via the virtual world client device.

* * * * *